(12) United States Patent
Asano et al.

(10) Patent No.: US 9,016,673 B2
(45) Date of Patent: Apr. 28, 2015

(54) LIQUID-FILLED VIBRATION DAMPING DEVICE

(71) Applicant: Tokai Rubber Industries, Ltd., Komaki-shi, Aichi-ken (JP)

(72) Inventors: Eisuke Asano, Komaki (JP); Tomohiro Kanaya, Komaki (JP)

(73) Assignee: Sumitomo Riko Company Limited, Komaki-shi (JP)

( * ) Notice: Subject to any disclaimer, the term of this patent is extended or adjusted under 35 U.S.C. 154(b) by 76 days.

(21) Appl. No.: 13/917,803

(22) Filed: Jun. 14, 2013

(65) Prior Publication Data

US 2013/0277900 A1 Oct. 24, 2013

Related U.S. Application Data

(63) Continuation of application No. PCT/JP2012/081971, filed on Dec. 10, 2012.

(30) Foreign Application Priority Data

Dec. 26, 2011 (JP) ................. 2011-284002

(51) Int. Cl.
   *F16F 5/00* (2006.01)
   *F16F 13/08* (2006.01)
   *F16F 13/26* (2006.01)

(52) U.S. Cl.
   CPC ............ *F16F 13/08* (2013.01); *F16F 13/268* (2013.01); *F16F 2224/04* (2013.01)

(58) Field of Classification Search
   CPC ......... F16F 13/10; F16F 13/20; F16F 13/268; F16F 2224/04; F16F 2230/183
   USPC ............................................. 267/140–141.7
   See application file for complete search history.

(56) References Cited

U.S. PATENT DOCUMENTS

| | | | |
|---|---|---|---|
| 3,879,023 A * | 4/1975 | Pearce et al. | 267/64.11 |
| 6,082,718 A * | 7/2000 | Yamada et al. | 267/140.14 |
| 2006/0075895 A1* | 4/2006 | Shimada et al. | 95/233 |

FOREIGN PATENT DOCUMENTS

| JP | 57-163747 A | 10/1982 |
|---|---|---|
| JP | 58-221028 A | 12/1983 |

(Continued)

OTHER PUBLICATIONS

Notification of Transmittal of Translation of the International Preliminary Report on Patentability (Form PCT/IB/338) of International Application No. PCT/JP2012/081971 mailing date of Jul. 10, 2014, with Forms PCT/IB/373 and PCT/ISA/237.

(Continued)

*Primary Examiner* — Vishal Sahni
(74) *Attorney, Agent, or Firm* — Westerman, Hattori, Daniels & Adrian, LLP

(57) ABSTRACT

An excellent liquid-filled vibration damping device is provided, which is capable of effectively suppressing cavitation, which may otherwise cause abnormal noises, without impairing a vibration damping effect. The inventive liquid-filled vibration damping device includes a liquid-filled space partitioned into a primary liquid chamber and a secondary liquid chamber communicating with each other through an orifice, a molded vulcanized rubber member which defines at least a part of the liquid-filled space, and a first retention member and a second retention member retaining the molded vulcanized rubber member. Liquid (P) to be sealingly contained in the liquid-filled space comprises a polar organic solvent as a major component, and not less than 0.2 cm$^3$ of a gas per 1 cm$^3$ of the liquid as measured at an ordinary temperature at an atmospheric pressure is dissolved in the liquid.

4 Claims, 4 Drawing Sheets

(56) References Cited

FOREIGN PATENT DOCUMENTS

| JP | 11-063087 A | 3/1999 |
| JP | 2004-169750 A | 6/2004 |
| JP | 2004-263784 A | 9/2004 |
| JP | 2005-337348 A | 12/2005 |
| JP | 2012-31897 A | 2/2012 |
| WO | 2009/154222 A1 | 12/2009 |

OTHER PUBLICATIONS

International Search Report dated Feb. 12, 2013, issued in corresponding application PCT/JP2012/081971.

* cited by examiner

RELATED ART

LIQUID-FILLED VIBRATION DAMPING DEVICE

RELATED APPLICATION

This application is a continuation of International Application No. PCT/JP2012/081971, filed on Dec. 10, 2012, which claims priority to Japanese Patent Application No. 2011-284002, filed on Dec. 26, 2011, the entire contents of each of which are hereby incorporated by reference.

BACKGROUND OF THE INVENTION

1. Field of the Invention

The present invention relates to a liquid-filled vibration damping device for use in automotive vehicles and industrial machinery.

2. Description of the Related Art

Liquid-filled vibration damping devices are advantageously used for engine mounts, transmission mounts, suspension bushes, motor mounts and the like in automotive vehicles and industrial machinery.

Referring to FIG. 4, for example, an engine mount (see, for example, JP-A-2005-337348) includes an upper retention member 1 to be attached to an engine (vibration source), and a lower retention member 2 to be attached to a vehicle body or a frame. The upper retention member 1 and the lower retention member 2 are unified together by a molded vulcanized rubber member 3 and a tubular member 4. A diaphragm 5 is attached to the lower retention member 2, and a liquid-filled space in which liquid P is sealingly contained is defined between the diaphragm 5 and the molded vulcanized rubber member 3. The liquid-filled space is partitioned into two vertically arranged chambers, i.e., a primary liquid chamber 9 and a secondary liquid chamber 10, by a partition member 8 formed with an orifice 7. The liquid P flows between the two chambers 9, 10 through the orifice 7. In FIG. 4, reference numerals 11 and 12 denote mounting bolts.

With this arrangement, even if the molded vulcanized rubber member 3 receives vibrations of the engine, vibrations to be transmitted to the vehicle body are damped by a vibration absorbing effect provided by the resilience of the molded vulcanized rubber member 3 and a fluid effect of the liquid P in the liquid-filled space.

Further, a fluid-filled vibration damping device (see, for example, JP-A-2004-169750) is proposed, which has a region filled with a non-compressive fluid and is improved in vibration damping capability by adding a predetermined volume of air into the fluid-filled region. In order to facilitate the addition of the air by means of simplified equipment and to accurately control the volume of the air to be added, the fluid-filled vibration damping device has a gas retaining hole which opens in the fluid-filled region to retain the gas. In assembling the fluid-filled vibration damping device, a plurality of combinational members cooperatively defining the fluid-filled region are combined together in the non-compressive fluid with the gas retained in the gas retaining hole, whereby the fluid-filled region is formed as including the gas retaining hole in which the gas is retained.

With recent drastic technological innovation in the automotive industry, very quiet driving as compared with the prior art has been achieved. Problematically, the engine mount is liable to suffer from abnormal noises and vibrations when great vibrations are applied to the engine due to undulations on a road. This is because the internal pressure of the pressure receiving chamber (primary liquid chamber) of the engine mount is suddenly drastically reduced to form cavitation bubbles in the pressure receiving chamber when the elastic rubber member of the engine mount is significantly resiliently deformed due to the vibrations applied to the engine and, when the bubbles disappear, impulse waves are generated and transmitted to the vehicle body to cause the abnormal noises and the vibrations.

For suppression of the cavitation, there have been proposed a method such that a pressure difference between the primary liquid chamber 9 and the secondary liquid chamber 10 is reduced by providing a relief valve or a like device, and a method such that reduction in the internal pressure of the primary liquid chamber 9 is suppressed by adding liquid having a higher vapor pressure (or a lower boiling point) to the fill-in liquid P and vaporizing the higher vapor pressure liquid at a negative pressure (see, for example, WO2009/154222).

With the provision of the relief valve or the like device, however, the pressure difference between the primary liquid chamber 9 and the secondary liquid chamber 10 is reduced when the valve is opened for the suppression of the cavitation. Therefore, the amount of the liquid P flowing through the orifice 7 for the damping is reduced, thereby reducing the vibration damping capability. This makes it impossible to sufficiently provide the intended vibration damping effect.

In the method in which the higher vapor pressure liquid is added as disclosed in WO2009/154222, the liquid to be added has a lower boiling point. Where the engine mount is used in an environment such as an engine room likely to be heated to a higher temperature, therefore, the added liquid boils even at a non-negative pressure, and a large volume of gas is constantly present in the liquid chambers. This reduces the vibration damping capability, and causes expansion and rupture of the diaphragm, resulting in a problem associated with the function of the product.

In view of the foregoing, it is an object of the present invention to provide an excellent liquid-filled vibration damping device which is capable of effectively suppressing the cavitation, which may otherwise cause abnormal noises, without impairing the vibration damping effect.

SUMMARY OF THE INVENTION

To achieve the above object, the liquid-filled vibration damping device according to the present invention comprises a liquid-filled space which sealingly contains liquid, a partition member which partitions the liquid-filled space into a plurality of chambers communicating with each other through an orifice, a molded vulcanized rubber member which defines at least a part of the liquid-filled space, and a retention member which retains the molded vulcanized rubber member, and is adapted to damp vibrations transmitted to the molded vulcanized rubber member by resilient deformation of the molded vulcanized rubber member and flow of the liquid between the chambers, wherein the liquid comprises a polar organic solvent as a major component, and not less than 0.2 $cm^3$ of a gas per 1 $cm^3$ of the liquid as measured at an ordinary temperature at an atmospheric pressure is dissolved in the liquid, whereby the device alleviates a pressure change occurring in the liquid-filled space due to the resilient deformation of the molded vulcanized rubber member by gasification and liquefaction of the dissolved gas.

Inventors of the present invention conducted studies on the method of suppressing the cavitation in the liquid-filled vibration damping device without impairing the vibration damping effect. As a result, the inventors found that, even if the internal pressure of the liquid-filled space is suddenly reduced to a negative pressure level, the gas generated by the gasification is prevented from forming large bubbles by alleviating the negative pressure in a short period of time, thereby suppressing the cavitation. As a result of further studies, the inventors found that, in order to alleviate the sudden reduction in the internal pressure of the liquid-filled space, it is very effective to dissolve a great amount of gas in the liquid and generate a large volume of gas from the dissolved gas at a negative pressure, and attained the present invention.

The liquid to be contained in the inventive liquid-filled vibration damping device comprises the polar organic solvent as the major component, and not less than 0.2 cm$^3$ of the gas per 1 cm$^3$ of the liquid as measured at the ordinary temperature at the atmospheric pressure is dissolved in the liquid. When a negative pressure occurs, therefore, a large volume of gas is instantly generated from the dissolved gas to alleviate the negative pressure. This suppresses the formation of large bubbles, which may otherwise cause the cavitation. Thus, an excellent cavitation suppressing effect can be provided. This substantially prevents the abnormal noises from occurring due to the cavitation without impairing the vibration damping capability based on the fluidity of the liquid. Therefore, the environment (e.g., the inside of the vehicle body) installed with the vibration damping device can be kept quiet.

In the inventive liquid-filled vibration damping device, the polar organic solvent preferably comprises at least one of ethylene glycol and propylene glycol. In this case, the gas is easily dissolved in the liquid, so that the liquid-filled vibration damping device is excellent in vibration damping effect based on the flow of the liquid.

In the inventive liquid-filled vibration damping device, the gas to be dissolved in the liquid is particularly preferably ammonia or hydrogen chloride. These gases each have a very high solubility in the liquid at the ordinary temperature at the atmospheric pressure, so that the volume of the generated gas is sufficient to alleviate the negative pressure in the liquid-filled space.

In the present invention, the term "ordinary temperature" is defined as a temperature (typically 25° C.) such that the liquid in which the gas is dissolved is neither heated nor cooled, and the term "atmospheric pressure" is defined as a pressure such that the liquid is neither pressurized nor depressurized.

DETAILED DESCRIPTION OF THE INVENTION

The present invention will hereinafter be described in detail by way of an embodiment thereof. It should be understood that the invention be not limited to this embodiment.

Figure 1:
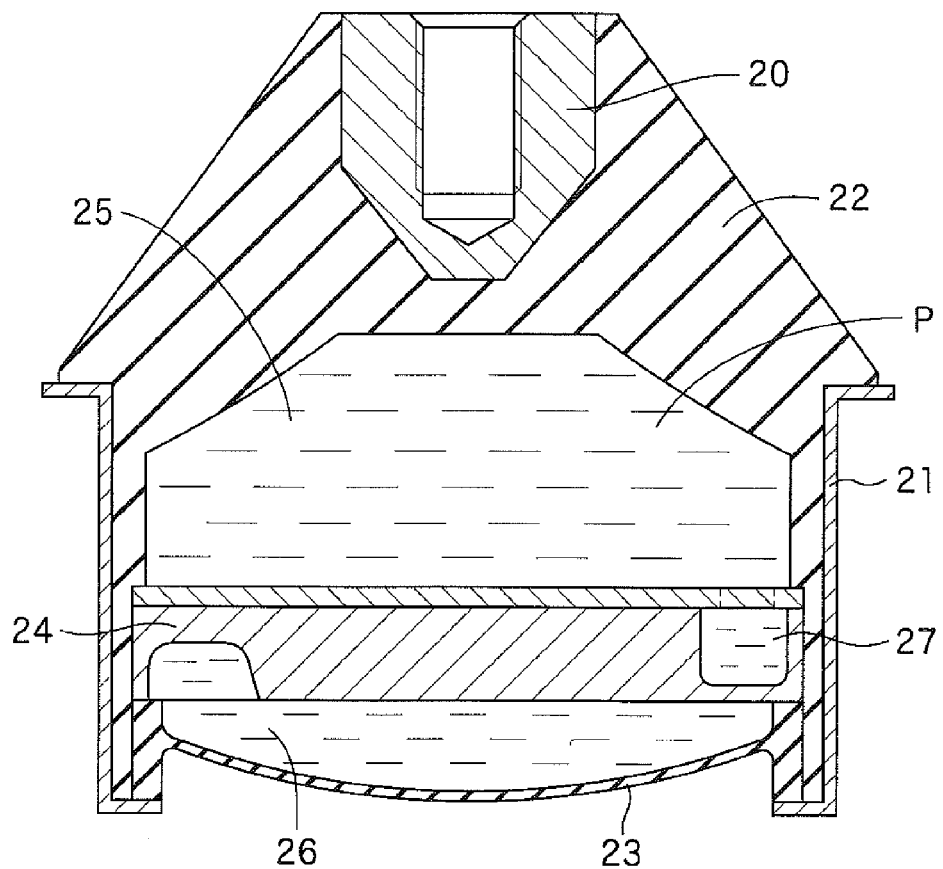
FIG. 1 is a vertical sectional view showing an embodiment of the present invention.

A liquid-filled vibration damping device according to the embodiment of the present invention is shown in FIG. 1. The liquid-filled vibration damping device includes a first retention member 20 to be attached to an engine (vibration source) via bolts (not shown), and a generally hollow cylindrical second retention member 21 to be attached to a vehicle body or a frame via a predetermined fixture member (not shown).

The first retention member 20 and the second retention member 21 are unified together by a molded vulcanized rubber member 22. A diaphragm 23 is liquid-tightly attached to an inner side of a lower open end of the second retention member 21. A liquid-filled space in which liquid P is sealingly contained is defined between the molded vulcanized rubber member 22 and the diaphragm 23.

The liquid-filled space is partitioned into two vertically arranged chambers, i.e., a primary liquid chamber 25 and a secondary liquid chamber 26, by a partition member 24. The primary liquid chamber 25 and the secondary liquid chamber 26 communicate with each other through an orifice 27 provided in a peripheral portion of the partition member 24.

With this arrangement, when the molded vulcanized rubber member 22 receives vibrations of the engine, vibrations to be transmitted to the vehicle body are damped to a very low level by a vibration absorbing action based on the resistance of the molded vulcanized rubber member 22 and a flow action of the liquid P in the liquid-filled space. Thus, the liquid-filled vibration damping device exhibits an excellent vibration damping capability.

In this device, the liquid P contained in the liquid-filled space contains a polar organic solvent as a major component, and not less than 0.2 cm$^3$ of a gas per 1 cm$^3$ of the liquid as measured at the ordinary temperature at the atmospheric pressure is dissolved in the liquid.

Usable examples of the polar organic solvent as the major component of the liquid P include ethylene glycol (EG), propylene glycol (PG) and a liquid mixture of ethylene glycol and propylene glycol, which are typically used as a fill-in liquid for the conventional liquid-filled vibration damping device.

Other usable examples of the polar organic solvent include glycol solvents such as butyl diglycol, methyl triglycol, butyl triglycol and methyl polyglycol. The liquid P may further contain water, other polar fluid or the like. Particularly, the liquid mixture of ethylene glycol and propylene glycol is preferred, and the mixing ratio is preferably EG:PG=50:50 to 90:10.

The term "major component" as used herein is intended to also include a case in which the liquid P contains the major component alone. Therefore, the liquid P may contain the polar organic solvent alone, or may contain a bubbling suppressing agent, an antioxidant and the like as an optional component in addition to the polar organic solvent.

The volume of the gas to be dissolved in the liquid P should be not less than 0.2 cm$^3$ per 1 cm$^3$ of the liquid P as measured at the ordinary temperature at the atmospheric pressure. If the volume of the dissolved gas is significantly less than 0.2 cm$^3$, the effect of alleviating the change in the internal pressure of the liquid-filled space to suppress the cavitation is insufficient. As the volume of the dissolved gas increases, the cavitation suppressing effect is increased. If the volume of the dissolved gas is greater than 1000 cm$^3$, however, the vibration damping capability of the liquid-filled vibration damping device based on the flow of the liquid P is potentially disadvantageously liable to be reduced.

Preferably, the gas to be dissolved in the liquid P has a very high solubility in the liquid P. Examples of the gas include ammonia and hydrogen chloride. Ammonia is more preferred, because hydrogen chloride is toxic.

The gas volume of ammonia soluble in 1 cm$^3$ of water at 25° C. at the atmospheric pressure is about 613 cm$^3$. The gas volume of hydrogen chloride soluble in 1 cm$^3$ of water at 25° C. at the atmospheric pressure is about 426 cm$^3$. These gases each have substantially the same solubility as described above in the liquid P to be used in the present invention, and each provide a sufficient amount of dissolved gas.

Exemplary methods for dissolving the gas in the liquid P include various aeration methods, for example, a method such that the gas is bubbled in the liquid P, a method such that the liquid P and the gas are forcibly circulated in a mixed state, and a method such that the liquid P is repeatedly caused to fall in a space filled with the gas to be brought into contact with the gas. Ammonia and hydrogen chloride each have an irritating odor. If it is difficult to handle these gases in a closed system, therefore, it is preferred to prepare an aqueous solution of the gas and blend the solution in the liquid P rather than to employ any of the aeration methods.

Where the polar organic solvent for the liquid P is prepared by mixing a plurality of liquids (e.g., EG and PG), a certain volume of air is trapped in the liquid during the mixing to be thereby present in the form of dissolved air. The use of the polar organic solvent containing the dissolved air is preferred, because the dissolved air as well as the dissolved gas intentionally contained in the liquid P functions to alleviate the change in the internal pressure of the liquid-filled space by repeated gasification and liquefaction occurring due to the pressure change.

In the present invention, the specific liquid P described above is thus contained in the liquid-filled space, so that a large volume of gas can be instantly generated from the dissolved gas at a negative pressure to alleviate the negative pressure, thereby suppressing the generation of large bubbles which may otherwise cause the cavitation. Thus, an excellent cavitation suppressing effect can be provided. This substantially prevents the abnormal noises from occurring due to the cavitation without impairing the vibration damping capability of the device based on the fluidity of the liquid. Therefore, the environment (e.g., the inside of the vehicle body) installed with the vibration damping device can be kept quiet.

Next, an exemplary method for producing an engine mount will be described.

First, a mold for molding a rubber member is prepared, and a first retention member 20 and a second retention member 21 are respectively set at predetermined positions in the mold. Then, an unvulcanized rubber composition as a material for the rubber member 22 was fed into the mold and heated, whereby the rubber member 22 is molded and vulcanized to be unified together with the first retention member 20 and the second retention member 21. Subsequently, a diaphragm 23 preliminarily formed by heat-molding is prepared. The unification product obtained by unifying the molded vulcanized rubber member 22 with the first retention member 20 and the second retention member 21 is immersed in a liquid container in which the liquid P is stored, and a partition member 24 and the diaphragm 23 are inserted into the unification product from a lower open end of the second retention member 21 to be respectively fixed at predetermined positions. Then, the resulting product was taken out of the liquid container. Thus, the liquid P is sealed between the molded vulcanized rubber member 22 and the diaphragm 23. Thereafter, the lower end of the second retention member 21 is clamped to perfectly seal the liquid P. Thus, the engine mount is provided.

In the embodiment described above, the inventive liquid-filled vibration damping device is applied to the engine mount by way of example. The engine mount described above is of a pendant type, but may be of an erect mounting type. The inventive liquid-filled vibration damping device is applicable to various vibration damping devices including automotive suspension bushes and motor mounts in addition to engine mounts.

EXAMPLES

Next, inventive examples will be described in conjunction with comparative examples.

Examples 1 to 5 and Comparative Example 1

Engine mounts each having the same construction as shown in FIG. 1 were produced by using liquids respectively having formulations shown below in Table 1 as the liquids P to be sealed in their liquid-filled spaces. For the respective liquids P, predetermined amounts of ammonia water (having a concentration of 10 wt %) were blended in the liquids P, and the amounts ($cm^3$) of dissolved ammonia (gas) shown in Table 1 were each determined by converting the amount of the blended ammonia water into the amount of dissolved ammonia (gas) per 1 $cm^3$ of the liquid P at the ordinary temperature at the atmospheric pressure.

Figure 2:
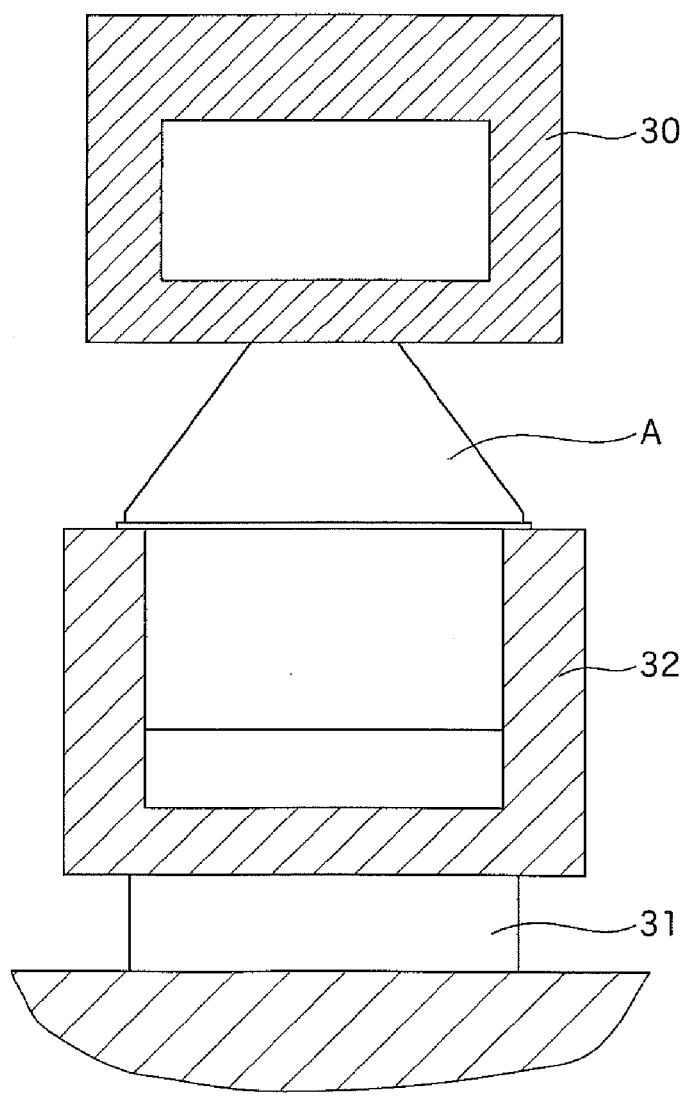
FIG. 2 is a schematic diagram for explaining how to measure a transmission load applied to an engine mount.

The engine mounts A thus produced were each attached to a vibration generating device 30 as shown in FIG. 2, and further, the engine mounts A were attached to a load sensor 31 via mounting member 32. Then, mount displacement was inputted for simulating a situation where the engine mount was mounted in an automotive vehicle. Then, a load observed when vibrations were applied to the engine mount A was read by the load sensor 31, and load data was outputted through a high pass filter (500 Hz) for measurement of a transmission load (N). With the transmission load of the engine mount of Comparative Example 1 being defined as 100, the transmission loads of Examples 1 to 5 were calculated. The results are shown below in Table 1.

TABLE 1

|  | Example | | | | | Comparative Example |
|---|---|---|---|---|---|---|
|  | 1 | 2 | 3 | 4 | 5 | 1 |
| Liquid P (parts by weight) | | | | | | |
| EG | 70 | 70 | 70 | 100 | — | 70 |
| PG | 30 | 30 | 30 | — | 100 | 30 |
| Dissolved ammonia ($cm^3$ per 1 $cm^3$ of liquid P) | 1.3 | 2.5 | 4.0 | 2.5 | 2.5 | 0.1 |
| Transmission load | 75 | 54 | 43 | 61 | 48 | 100 |

The results described above indicate that the transmission load is smaller in Example 1 to 5 than in Comparative Example 1 and, therefore, the vibration damping capability is more excellent in Example 1 to than in Comparative Example 1. Furthermore, when the amount of dissolved ammonia (gas) is 0.5, 0.75 or 1 $cm^3$, similar result is obtained.

Figure 3A:
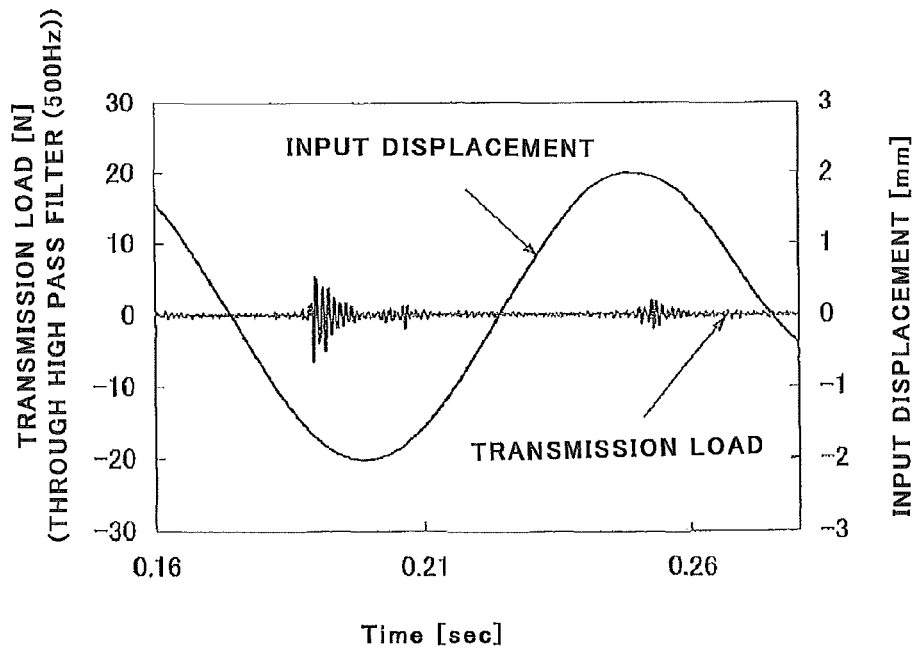
FIG. 3A is a diagram showing the vibration damping capability of a device according to an inventive example.
Figure 3B:
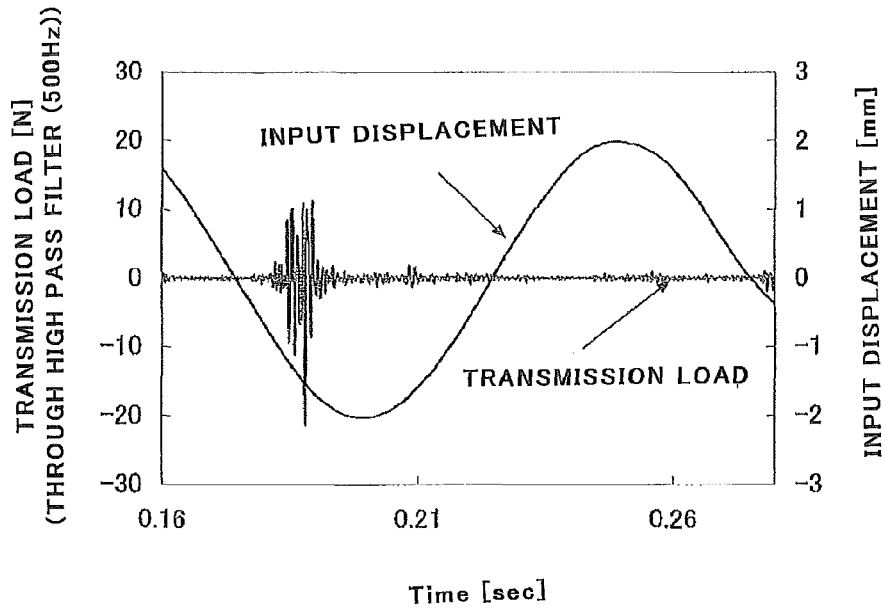
FIG. 3B is a diagram showing the vibration damping capability of a device according to a comparative example.
Figure 4:
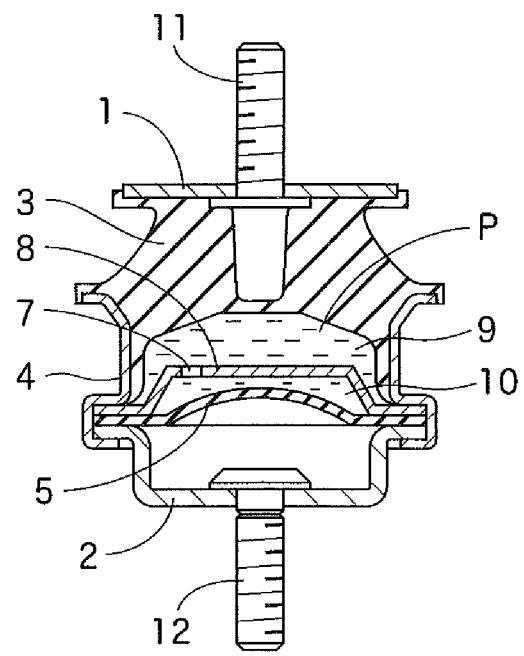
FIG. 4 is a sectional view showing a liquid-filled vibration damping device of the prior art.

For reference, the measurement results for Example 1 are shown in FIG. 3A, and the measurement results for Comparative Example 1 are shown in FIG. 3B.

While the present invention has thus been described by way of the specific examples thereof, it should be understood that these examples are merely illustrative but not limitative of the invention. Various modifications apparent to those skilled in the art are deemed to fall within the scope of the present invention.

The liquid-filled vibration damping device according to the present invention is applicable to engine mounts, transmission mounts, suspension bushes, motor mounts and the like for use in automotive vehicles and industrial machinery. Particularly, the inventive vibration damping device effectively suppresses abnormal noises which may otherwise occur due to cavitation.

What is claimed is:

1. A liquid-filled vibration damping device comprising:
a liquid-filled space which sealingly contains liquid;
a partition member which partitions the liquid-filled space into a plurality of chambers communicating with each other through an orifice;
a molded vulcanized rubber member which defines at least a part of the liquid-filled space; and
a retention member which retains the molded vulcanized rubber member;
the device being adapted to damp vibrations transmitted to the molded vulcanized rubber member by resilient deformation of the molded vulcanized rubber member and flow of the liquid between the chambers;
wherein the liquid comprises a polar organic solvent as a major component, and not less than 0.2 $cm^3$ of a gas per 1 $cm^3$ of the liquid as measured at 25° C. at an atmospheric pressure is dissolved in the liquid;
whereby the device alleviates a pressure change occurring in the liquid-filled space due to the resilient deformation of the molded vulcanized rubber member by gasification and liquefaction of the dissolved gas.

2. The liquid-filled vibration damping device according to claim 1, wherein the polar organic solvent comprises at least one of ethylene glycol and propylene glycol.

3. The liquid-filled vibration damping device according to claim 1, wherein the dissolved gas is one of ammonia and hydrogen chloride.

4. The liquid-filled vibration damping device according to claim 2, wherein the dissolved gas is one of ammonia and hydrogen chloride.

* * * * *